(12) United States Patent
Genereux et al.

(10) Patent No.: US 10,179,336 B2
(45) Date of Patent: Jan. 15, 2019

(54) PORTABLE AIR CLEANER WITH IMPROVED MULTI-STAGE ELECTROSTATIC PRECIPITATOR

(71) Applicant: Lasko Operation Holdings, LLC, Wilmington, DE (US)

(72) Inventors: Philippe J. Genereux, Ottawa (CA); Rudy A. Vandenbelt, Ottawa (CA)

(73) Assignee: Lasko Holdings, Inc., Wilmington, DE (US)

( * ) Notice: Subject to any disclaimer, the term of this patent is extended or adjusted under 35 U.S.C. 154(b) by 490 days.

(21) Appl. No.: 15/059,681

(22) Filed: Mar. 3, 2016

(65) Prior Publication Data

US 2016/0184834 A1 Jun. 30, 2016

Related U.S. Application Data

(63) Continuation of application No. 13/782,982, filed on Mar. 1, 2013, now Pat. No. 9,308,538.

(Continued)

(51) Int. Cl.
*B01D 53/02* (2006.01)
*B03C 3/32* (2006.01)
*B03C 3/45* (2006.01)
*B03C 3/12* (2006.01)
*B03C 3/36* (2006.01)
*B03C 3/47* (2006.01)
(Continued)

(52) U.S. Cl.
CPC ............. *B03C 3/32* (2013.01); *B01D 53/323* (2013.01); *B03C 3/12* (2013.01); *B03C 3/368* (2013.01); *B03C 3/41* (2013.01); *B03C 3/45* (2013.01); *B03C 3/47* (2013.01); *B03C 2201/04* (2013.01); *Y02A 50/2357* (2018.01)

(58) Field of Classification Search
CPC ..... B01D 53/323; B03C 2201/04; B03C 3/12; B03C 3/32; B03C 3/368; B03C 3/41; B03C 3/45; B03C 3/47; Y02A 50/2357
See application file for complete search history.

(56) References Cited

U.S. PATENT DOCUMENTS

| | | | | |
|---|---|---|---|---|
| 3,373,487 A | * | 3/1968 | Quintilian | B03C 3/86 206/442 |
| 3,418,792 A | * | 12/1968 | Quintilian | B03C 3/40 206/499 |
| 4,124,359 A | * | 11/1978 | Geller | B03C 3/40 96/65 |

(Continued)

*Primary Examiner* — Christopher P Jones
(74) *Attorney, Agent, or Firm* — Pepper Hamilton LLP (57) ABSTRACT

An electrostatic precipitation air cleaner to reduce ozone output is provided. The electrostatic precipitation air cleaner includes a housing with an air inlet and outlet. Located in the housing are an air mover for moving a stream of air along an airflow path between the inlet and the outlet, an ion emitter electrode positioned in the airflow path downstream of the inlet for ionizing particulates entrained in the stream of air, a collector electrode having an inlet downstream of the ion emitter electrode, and an intermediate element intermediate the ion emitter electrode and the collector electrode. The collector electrode is comprised of a plurality of collector plates spaced apart in a direction transverse to the airflow path. The plates are electrically biased to create and maintain an electric field in the space therebetween to precipitate ionized particulates entrained in the stream of air onto a confronting surfaces of the plates.

25 Claims, 9 Drawing Sheets

Related U.S. Application Data

(60) Provisional application No. 61/608,260, filed on Mar. 8, 2012, provisional application No. 61/608,274, filed on Mar. 8, 2012.

(51) Int. Cl.
 *B01D 53/32* (2006.01)
 *B03C 3/41* (2006.01)

(56) References Cited

U.S. PATENT DOCUMENTS

| | | | | |
|---|---|---|---|---|
| 4,496,375 | A * | 1/1985 | Le Vantine | B03C 3/32 96/66 |
| 5,076,820 | A * | 12/1991 | Gurvitz | B03C 3/51 96/72 |
| 5,665,147 | A * | 9/1997 | Taylor | B03C 3/08 96/72 |
| 7,105,041 | B2 * | 9/2006 | Dunn | B03C 3/09 96/66 |
| 2004/0161332 | A1 * | 8/2004 | Rabinowitz | F03H 1/00 415/80 |
| 2006/0203416 | A1 * | 9/2006 | Taylor | B03C 3/32 361/230 |
| 2008/0314250 | A1 * | 12/2008 | Cowie | B03C 3/08 96/86 |
| 2010/0155025 | A1 * | 6/2010 | Jewell-Larsen | F04B 19/006 165/96 |
| 2011/0261499 | A1 * | 10/2011 | Hizer | H01T 23/00 361/231 |
| 2011/0308775 | A1 * | 12/2011 | Honer | F04B 17/00 165/120 |

* cited by examiner

FIG. 9

PORTABLE AIR CLEANER WITH IMPROVED MULTI-STAGE ELECTROSTATIC PRECIPITATOR

RELATED APPLICATION DATA

This application is a continuation of U.S. patent application Ser. No. 13/782,982 filed Mar. 1, 2013, which claims priority to U.S. provisional application Ser. No. 61/608,260 filed Mar. 8, 2012 and U.S. provisional application Ser. No. 61/608,274 filed Mar. 8, 2012, the contents of which are incorporated herein by reference in their entirety.

TECHNOLOGY FIELD

The invention is directed to the field of gas purification, and more particularly, to portable electrostatic precipitation room air cleaners utilizing multiple stage electrostatic precipitation air filtration.

BACKGROUND

Electrostatic precipitation room air cleaners are very effective at removing particulates from the air and particularly excel when it comes to removing small particles. The filters are cost-effective, as the user does not have to purchase replacement filters on a regular basis, and they may be reused after washing.

One drawback to conventional electrostatic precipitation room air cleaners is that they typically produce ozone. Ozone can also be present as a naturally occurring component of room air. Regulatory bodies have enacted legislation to regulate the production of ozone so that its deleterious effects may be mitigated.

The electrostatic precipitation filtration systems of conventional electrostatic precipitation room air cleaners typically have consisted of an ion emitter and a collector electrode stage cooperative to provide ions and to precipitate ionized particulates out of the air stream. The conventional emitter electrode stage may include an ion source such as, for example, a wire ion emitters. The conventional collector electrode stage typically comprise a plurality of electrically biased flat or uni-planar collector plates.

The ozone produced by such conventional electrostatic precipitation room air cleaners results from the high ionization potential of the ion emitters and from "arcing" between the collector plates that occurs during the accumulation of ionized particulate precipitation onto their collector plates. The level of ozone produced by conventional electrostatic precipitation room air cleaners has typically been controlled to conform to regulated levels by an ozone remediation element. The conventional ozone remediation element is operable to convert controlled amounts of ozone into oxygen just prior to the air exiting the housings of such conventional electrostatic precipitation room air cleaners.

The two stage electrostatic precipitation systems of conventional electrostatic precipitation air cleaners have typically required multiple ion wires emitters and cooperative ion stripper plates in order to provide a clean air delivery rate (CADR) sufficient to clean a room of ordinary size. Not only does the cost increase according to the number of wires employed, but the quantity of ozone also increases. Since the multiple wire ion emitters are each subject to their own corona discharge, the quantity of ozone increases according to the number of wires employed.

Another problem with the two stage electrostatic precipitation systems of conventional electrostatic precipitation air cleaners is the arcing that may occur between the electrically biased collector plates. Arcing between the collector plates may occur because large particles of dust or other debris have bridged the space between two of the biased collector plates. Conventional electrostatic precipitation air cleaners have responded by placing additional filters prior to the ion emitter to prevent such large debris from entering the electrostatic precipitation system. The addition of this filter increases the cost of the device.

Yet another reason arcing may occur is when one of the flat or uni-planar biased collector plates is distorted, so as to reduce the space between itself and the adjacent biased collector plates. When this space is reduced sufficiently, an electrical arc can occur between the plates. Conventional electrostatic precipitation air cleaners have responded by adding additional structures between the flat or uni-planar biased collector plates, such as, for example, spacers. Not only do such spacers increase the cost of the device, they also inhibit air flow. These spacers also have been found to collect debris, and debris accumulation may be sufficient to bridge the space between the flat or uni-planar biased collector plates and cause electrical arcing to occur.

SUMMARY

In view of the deficiencies of conventional electrostatic precipitation air cleaners, what is needed is an improved electrostatic precipitation air cleaner that reduces and/or eliminates ozone which results from the electrostatic precipitation process and mitigates the arcing problem associated with the biased collector plates.

It is also desirable that the improved electrostatic precipitation air cleaner reduces materials and manufacturing costs while providing a clean air delivery rate sufficient to clean an ordinary sized room. In short, the improved electrostatic precipitation air cleaner should overcome the deficiencies of conventional technology while preserving and/or enhancing the functionality and performance of the system.

Accordingly, the present invention discloses an improved performance electrostatic precipitation room air cleaner having multi-stage electrostatic precipitation filter systems that reduce and/or eliminate ozone which results from the electrostatic precipitation process. The improved performance electrostatic precipitation room air cleaners may also reduce and/or eliminate ozone which is naturally present in room air.

A related object is to disclose a multi-stage electrostatic precipitation filter system providing improved performance electrostatic precipitation room air cleaners whose component stages may be removed for cleaning and may be dishwasher safe.

A further related object of the present invention is to disclose a multi-stage electrostatic precipitation filter system providing improved performance electrostatic precipitation room air cleaners in which arcing between biased collector plates is reduced or eliminated.

Yet another object of the present invention is to disclose an electrostatic precipitation filter that improves performance due to flow redirection causing improved particle capture.

Yet another object is to disclose an improved electrostatic precipitation air cleaner that reduces cost of assembly/manufacture as material usage and labor time are reduced.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following Figures.

DETAILED DESCRIPTION OF ILLUSTRATIVE EMBODIMENTS

Figure 1:
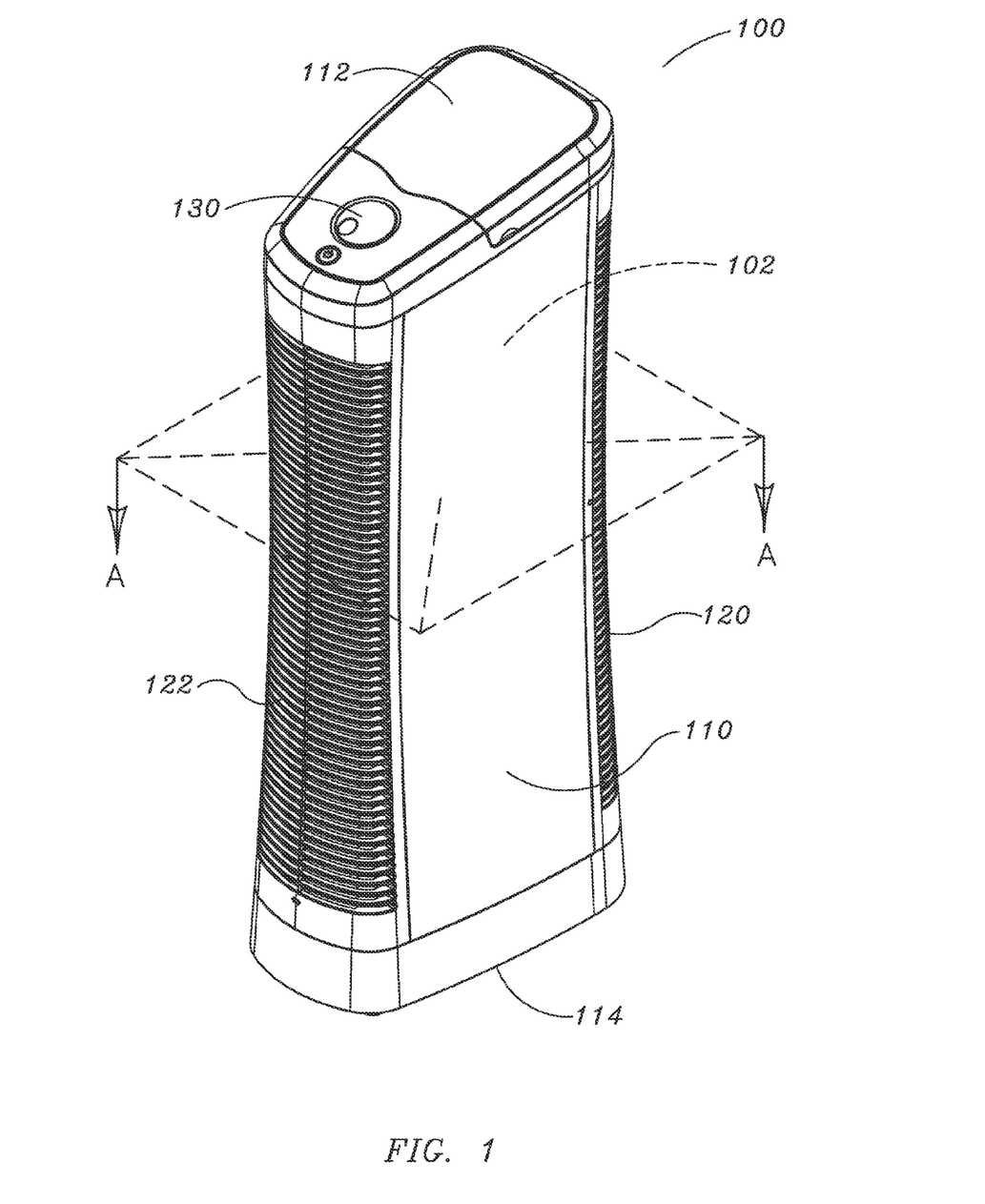
FIG. 1 is a front perspective view of an exemplary embodiment of an improved electrostatic precipitation air cleaner.

FIG. 1 is a front perspective view of an exemplary embodiment of improved electrostatic precipitation air cleaner 100. Air cleaner 100 includes housing 110 having air intake 120 and air exit 122. Housing 110 defines internal space 102. Also shown is base 114 that provides an interface between air cleaner 100 and a mounting surface, such as, for example, a floor or table. Control 130 and filter access door 112 are located on a top portion of housing 110 to provide easy access for the user.

Figure 2:
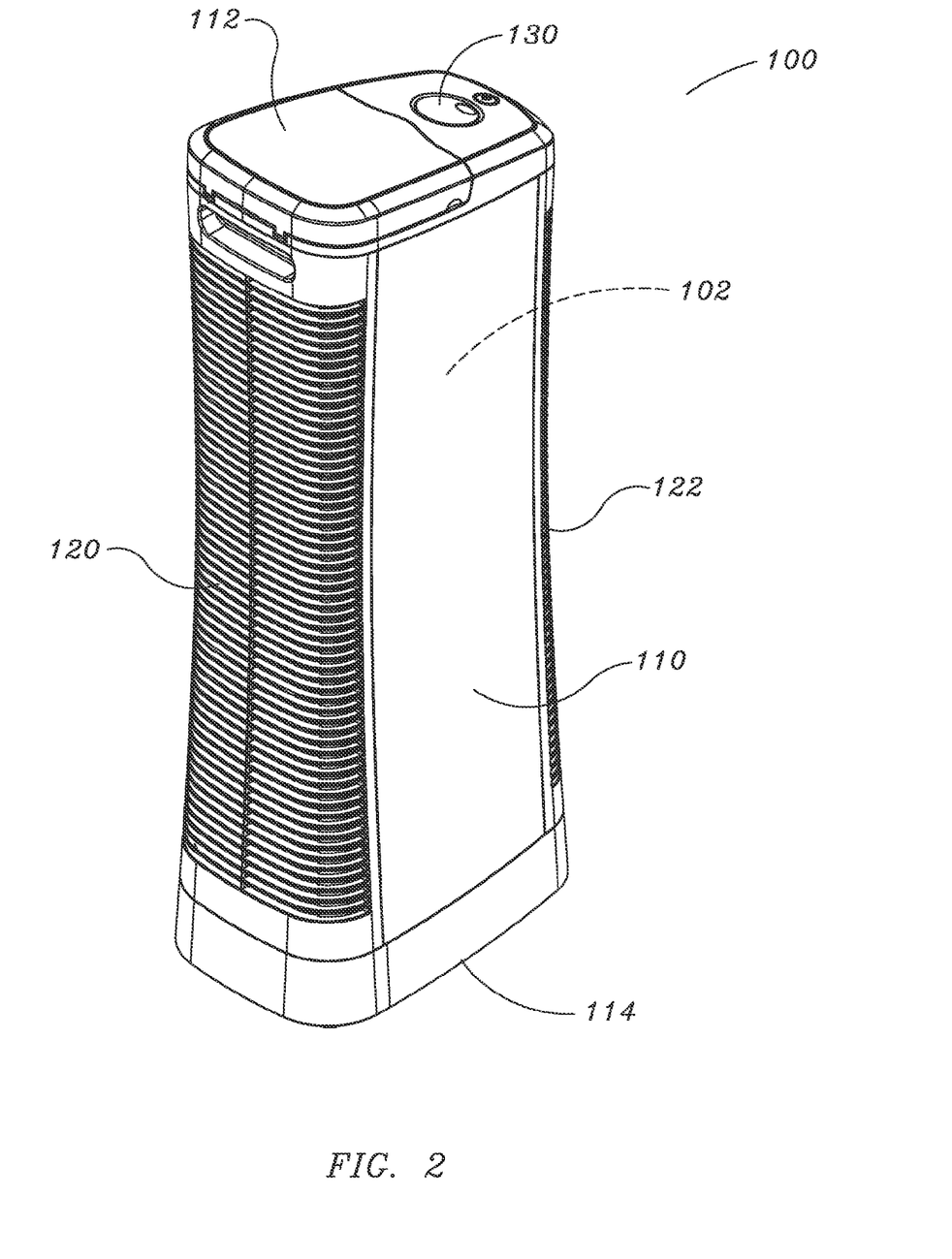
FIG. 2 is a rear perspective view of the exemplary embodiment of FIG. 1.

FIG. 2 is a rear perspective view of the exemplary embodiment of improved electrostatic precipitation air cleaner 100 of FIG. 1.

Figure 3:
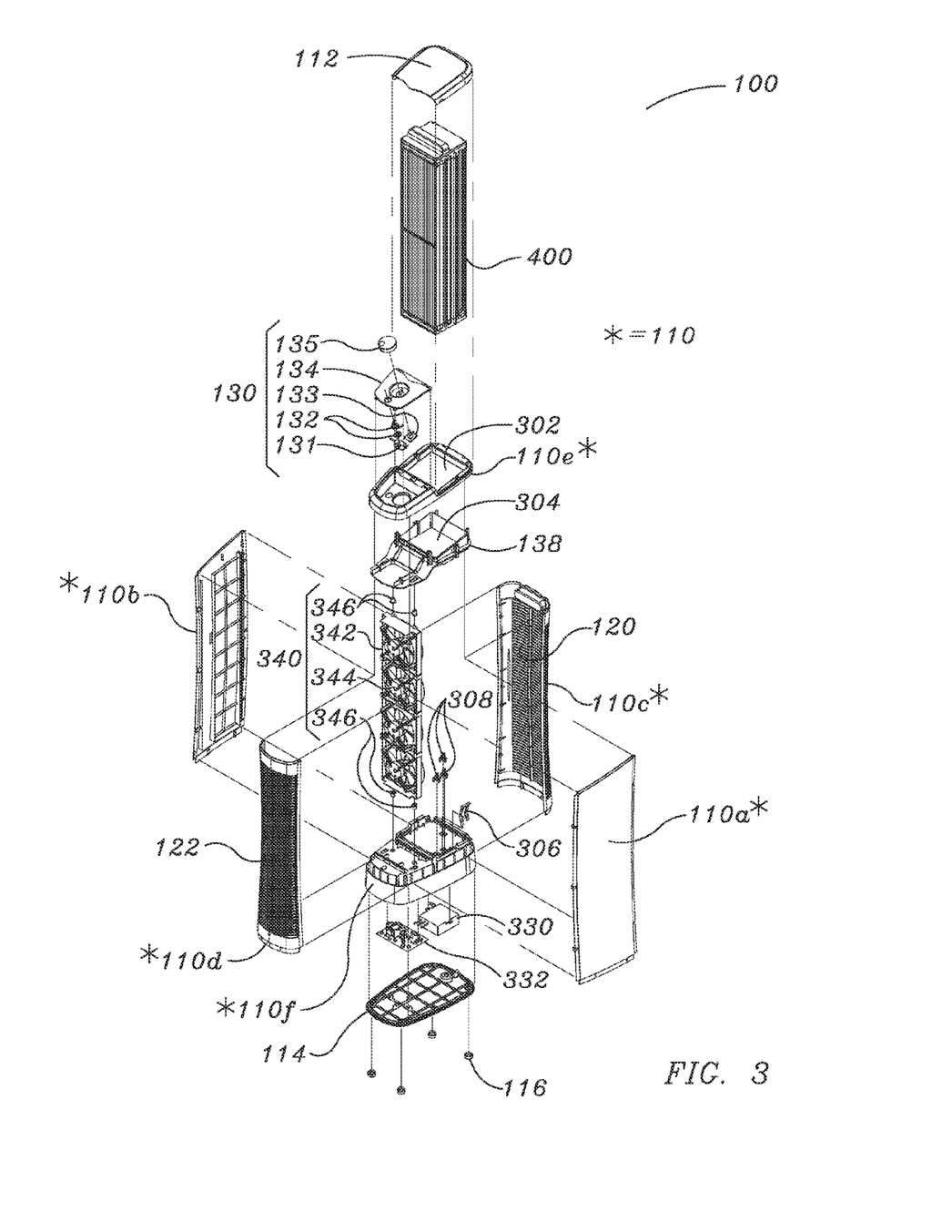
FIG. 3 is a front perspective exploded view of the exemplary embodiment of FIG. 1.

FIG. 3 is a front perspective exploded view of improved electrostatic precipitation air cleaner 100 of FIG. 1. Housing 110 is comprised of right panel 110a, left panel 110b, rear panel 110c, front panel 110d, housing top 110e, and housing bottom 110f. Air intake 120 and air exit 122 are located in rear panel 110c and front panel 110d, respectively.

Control 130 is mounted to housing top 110e. As shown, control 130 includes tactile switch 131, operator interface 132, rotary switch 133, switch panel 134, and knob 135. Internal frame 138 is attached to housing top 110e.

Base 114 is mounted to housing bottom 110f, creating a mounting cavity for power supply 330 and PCB/voltage source 332. Feet 116 are attached to base 114 and provide improved electrostatic precipitation air cleaner 100 stability when located on a flat mounting surface.

Housing 110 when assembled defines internal space 102 as shown in FIGS. 1 and 2. As shown, air mover 340 and filter cell 400 are located within internal space 102 defined by housing 110.

Air mover 340 includes multiple air generators 344 mounted to array plate 342. Array plate 342 is attached to housing 110 through vibration mounts 346. When in operation, control 130 may control and regulate the air volume produced by air mover 340 by regulating the speed and/or the number of air generators 344 in operation.

Filter cell 400 is installed in housing 110 through access ports 302 and 304 of housing top 110e and internal frame 138 respectively. Filter access door 112 covers access ports 302 and 304 after filter cell 400 is installed into housing 110 of improved electrostatic precipitation air cleaner 100. Electrical contact of filter cell 400 is achieved via spring contacts 308. De-gauss strip 306 contacts filter cell 400 during removal of filter cell 400 from housing 110 and dissipates any electrical charge that may reside in filter cell 400.

Improved electrostatic precipitation air cleaner 100 may be assembled utilizing conventional techniques, such as for example; screws, adhesives, snap fits, press fits, Velcro, sonic welding and the like without departing from the spirit of the invention.

Figure 4:
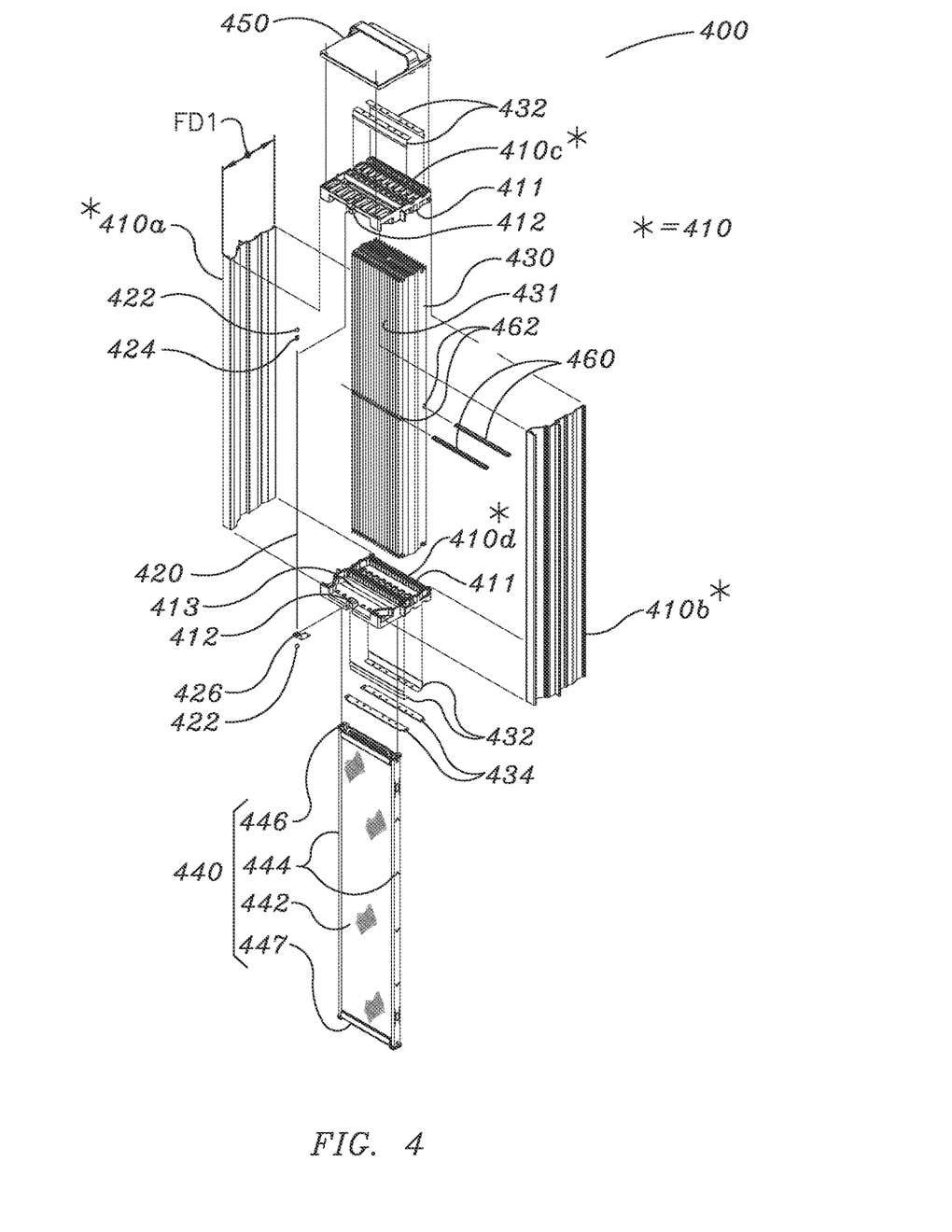
FIG. 4 is a rear exploded perspective view of a multi-stage electrostatic precipitation filter cell.

FIG. 4 is a rear exploded perspective view of a multi-stage electrostatic precipitation filter cell 400. Filter cell 400 includes filter frame 410 which includes right frame side 410a, left frame side 410b, frame top 410c, and frame bottom 410d. As shown, when assembled, ion emitter electrode 420, intermediate element 440, and collector electrode 430 are located within filter frame 410.

In the embodiment shown in FIG. 4, ion emitter electrode 420 is a wire extending between frame top 410c and frame bottom 410d. Ion emitter electrode 420 is attached through slot/socket 412 located in top and bottom frames 410c and 410d and retained in slot/socket 412 via anchor 422 crimped onto each distal end of ion emitter electrode 420. Spring 424 is used to maintain a straightness of ion emitter electrode 420 when assembled between top and bottom frames 410c and 410d by exerting light tension. Wire contact 426 contacts anchor 422 and ion emitter electrode 420 and makes electrical contact when filter cell 400 is installed in improved electrostatic precipitation air cleaner 100. As described, ion emitter electrode 420 can easily be replaced in filter cell 400 in case of damage.

Figure 5:
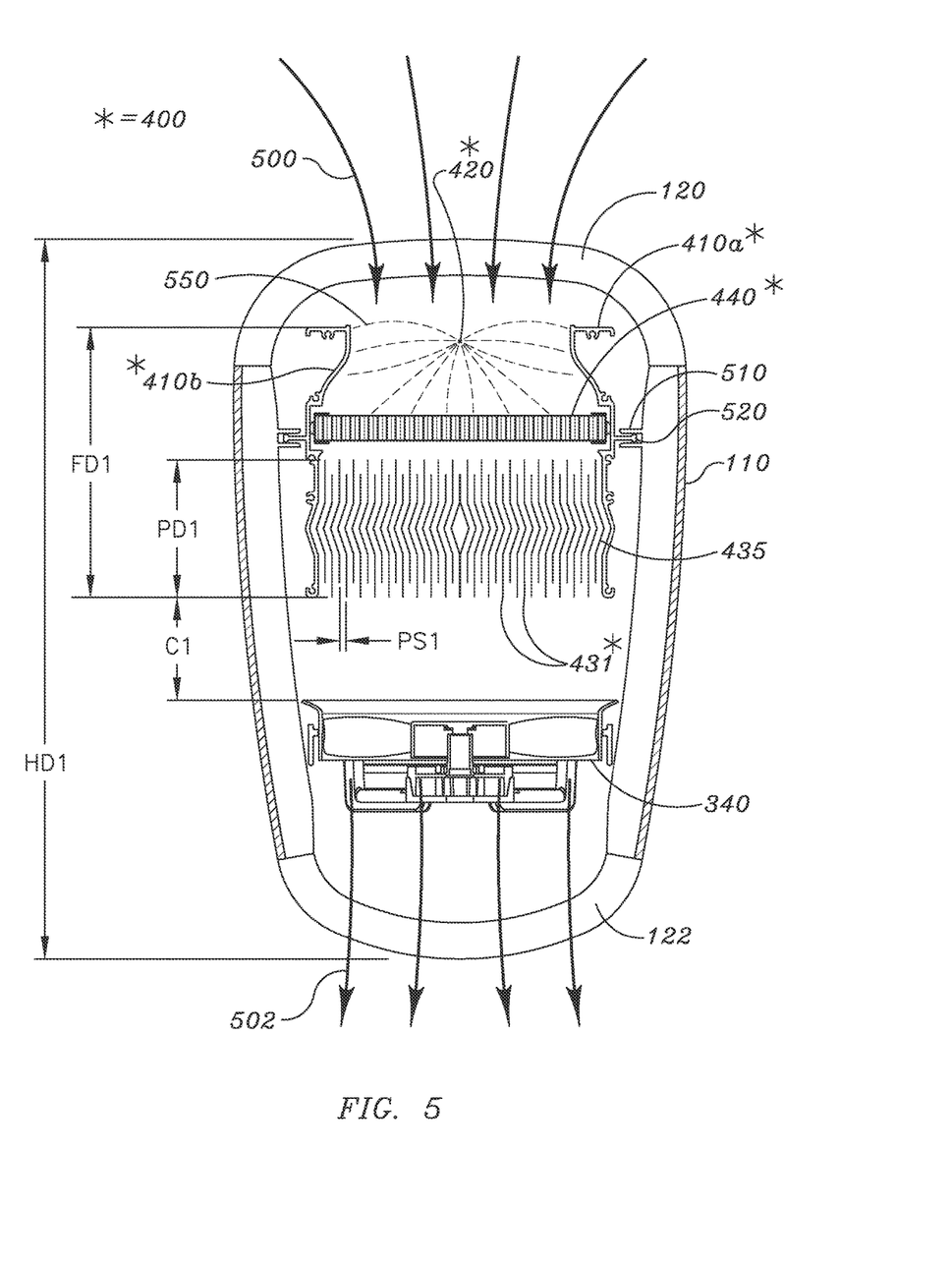
FIG. 5 is a horizontal cross section view AA of FIG. 1.

As shown in FIGS. 4 and 5, collector electrode 430 is comprised of a plurality of collector plates 431 that extend between top and bottom frames 410c and 410d. As shown in FIG. 5, collector plates 431 are not uni-planar having non parallel surfaces relative to each other, which facilitate the flatness and structural integrity. As shown in FIG. 4, each of the collector plates 431 may include spacer holes 462 to facilitate the installation of spacers 460. Spacers 460 may be used to maintain the desired space between each of the collector plates 431, especially as the vertical length of filter cell 400 increases.

Each of the collector plates 431 fit into plate slots 411 of top and bottom frames 410c and 410d. Collector plates 431, L-contacts 432, and plate contacts 434 are designed to electrically connect the collector electrode 430 when filter cell 400 is assembled and installed in improved electrostatic precipitation air cleaner 100.

Intermediate element 440 is comprised of air permeable mesh 442, sides 444, top 446, and bottom 447. Air permeable mesh 442 may be composed of a non-conductive material, such as, for example, polymer, paper, glass fibers, and the like. It is also contemplated that air permeable mesh 442 may be composed of an electrical conductive material, such as, for example, steel, aluminum, copper or other metals or metal alloys. Additionally, air permeable mesh 442 may be coated with carbon, manganese oxide, charcoal, titanium dioxide, and/or other materials for the purpose of facilitating odor and chemical removal from an air stream passing through air permeable mesh 442.

Intermediate element 440 is assembled into filter cell 400 through element slots 413 located in top and bottom frames 410c and 410d. As shown, intermediate element 440 can be removed from filter cell 400 through element slot 413 located in bottom frame 410d. When assembled, cell top 450 covers element slot 413 located in top frame 410c and, as such, prevents the removal of intermediate element 440 through top frame 410c. The ability to remove intermediate element 440 from filter cell 400 allows the user to periodically clean and/or replace intermediate element 440 absent the need of disassembling filter cell 400.

Also shown in FIG. 4 is filter depth (FD1). FD1 represents the maximum depth of filter cell 400 as measured in the direction of an air flow through filter cell 400. As shown, the FD1 of filter cell 400 corresponds substantially with the depth of right frame side 410a and left frame side 410b.

FIG. 5 is a horizontal cross section view AA of improved electrostatic precipitation air cleaner 100 shown in FIG. 1. As shown, intake air 500 is drawn into housing 110 through air intake 120 by air mover 340 and subsequently passes through ionization field 550, intermediate element 440, collector plates 431, air mover 340 and exits housing 110 through air exit 122 as clean air 502. As shown, collector plates 431 are not uni-planar having non parallel surfaces relative to each other, and include structural bends 435 which facilitate the flatness and structural integrity. Also shown are projections 520 corresponding with right frame side 410a and left frame side 410b of filter cell 400. Projections 520 interface with corresponding walls 510 of housing 110 to assure that filter cell 400 is installed correctly in the device.

Ionization field 550 is generated between ion emitter electrode 420 and right frame side 410a, left frame side 410b, and intermediate element 440 by inducing a biased voltage potential between ion emitter electrode 420 and right frame side 410a, left frame side 410b, and intermediate element 440. In a preferred embodiment, ion emitter electrode 420 is charged with a positive voltage and right frame side 410a, left frame side 410b, and intermediate element 440 are negatively charged or connected to ground.

Also shown are dimensions C1, PD1, PS1, HD1, and FD1. C1 is the clearance distance as measured in the direction of an air flow through filter cell 400 which is desired for efficient air flow from filter cell 400 to air mover 340. PD1 is the depth as measured in the direction of an air flow through filter cell 400 of collector plates 431 to provide sufficient filtration of intake air 500. PS1 is the dimension of the space between each of collector plates 431. HD1 is the overall depth of housing 110 as measured in the direction of an air flow through filter cell 400.

Figure 6:
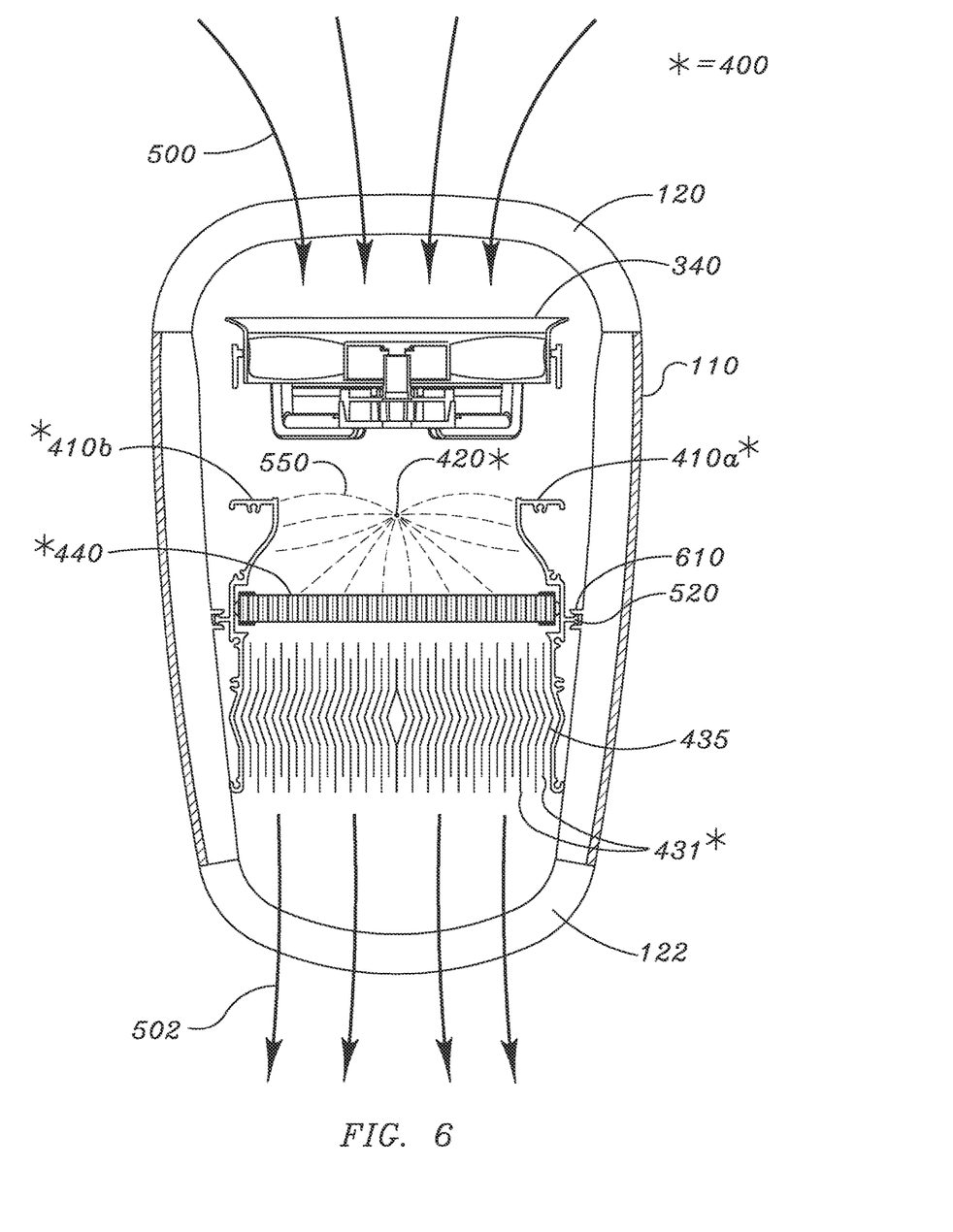
FIG. 6 is an alternate horizontal cross section view AA of FIG. 1.

FIG. 6 is an alternate horizontal cross section view AA of improved electrostatic precipitation air cleaner 100 shown in FIG. 1. As shown, intake air 500 is drawn into housing 110 through air intake 120 by air mover 340 and subsequently passes through air mover 340, ionization field 550, intermediate element 440, collector plates 431 (that include structural bends 435), and exits housing 110 through air exit 122 as clean air 502. Also shown are projections 520 corresponding with right frame side 410a and left frame side 410b of filter cell 400. Projections 520 interface with corresponding walls 610 of housing 110 to assure that filter cell 400 is installed correctly in the device. In all other aspects, alternate horizontal cross section view AA of FIG. 6 is similar to horizontal cross section view AA of FIG. 5.

Figure 7:
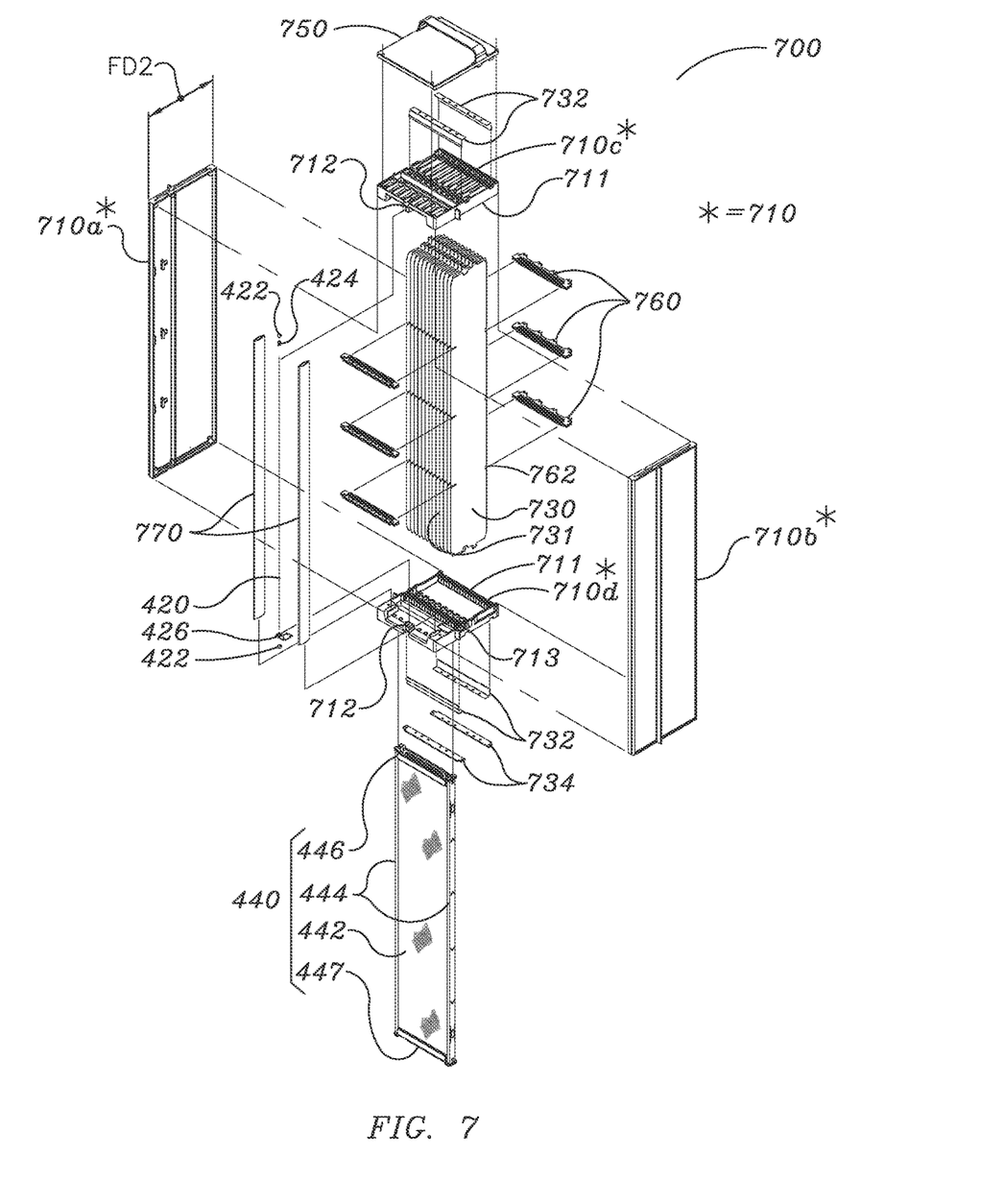
FIG. 7 is a rear exploded perspective view of another embodiment of a multi-stage electrostatic precipitation filter cell.

FIG. 7 is a rear exploded perspective view of another embodiment of a multi-stage electrostatic precipitation filter cell 700. Filter cell 700 includes filter frame 710 which includes right frame side 710a, left frame side 710b, frame top 710c, frame bottom 710d. As shown, when assembled ion emitter electrode 420, intermediate element 440, and collector electrode 730 are located within filter frame 710.

In the embodiment shown in FIG. 7, ion emitter electrode 420 is a wire extending between frame top 710c and frame bottom 710d. Also shown are electrically biased strippers 770 located on either side of ion emitter electrode 420 and extending between frame top 710c and frame bottom 710d. Ion emitter electrode 420 is attached through slot/socket 712 located in top and bottom frames 710c and 710d and retained in slot/socket 712 via anchor 422 crimped onto each distal end of ion emitter electrode 420. Spring 424 is used to maintain a straightness of ion emitter electrode 420 when assembled between top and bottom frames 710c and 710d by exerting light tension. Wire contact 426 contacts anchor 422 and ion emitter electrode 420 and makes electrical contact when filter cell 700 is installed in improved electrostatic precipitation air cleaner 100. As described, ion emitter electrode 420 can easily be replaced in filter cell 700 in case of damage.

Collector electrode 730 is comprised of a plurality of collector plates 731 that extend between top and bottom frames 710c and 710d. As shown, collector plates 731 are uni-planar. As shown, each of collector plates 731 may include spacer slots 762 to facilitate the installation of spacers 760. Spacers 760 are used to maintain the desired space between each of collector plates 731, especially as the vertical length of filter cell 700 increases.

Each of collector plates 731 fit into plate slots 711 of top and bottom frames 710c and 710d. Collector plates 731, L-contacts 732, and plate contacts 734 are designed to electrically connect the collector electrode 730 when filter cell 700 is assembled and installed in improved electrostatic precipitation air cleaner 100.

Intermediate element 440 is comprised of air permeable mesh 442, sides 444, top 446, and bottom 447. Air permeable mesh 442 may be composed of a non-conductive material, such, as for example, polymer, paper, glass fibers, and the like. It is also contemplated that air permeable mesh 442 may be composed of an electrical conductive material, such as, for example, steel, aluminum, copper or other metals or metal alloys. Additionally, air permeable mesh may be coated with carbon, manganese oxide, charcoal, titanium dioxide, and/or other materials for the purpose of facilitating odor and chemical removal from an air stream passing through air permeable mesh 442.

Intermediate element 440 is assembled into filter cell 700 through element slots 713 located in top and bottom frames 710c and 710d. As shown, intermediate element 440 can be removed from filter cell 700 through element slot 713 located in bottom frame 710d. When assembled, cell top 750 covers element slot 713 located in top frame 710c and, as such, prevents the removal of intermediate element 440 through top frame 710c. The ability to remove intermediate element 440 from filter cell 700 allows the user to periodically clean and or replace intermediate element 440 absent the need of disassembling filter cell 700.

Also shown in FIG. 7 is filter depth (FD2). FD2 represents the maximum depth of filter cell 700 as measured in the direction of an air flow through filter cell 700. As shown, the FD2 of filter cell 700 corresponds substantially with the depth of right frame side 710a and left frame side 710b.

Figure 8:
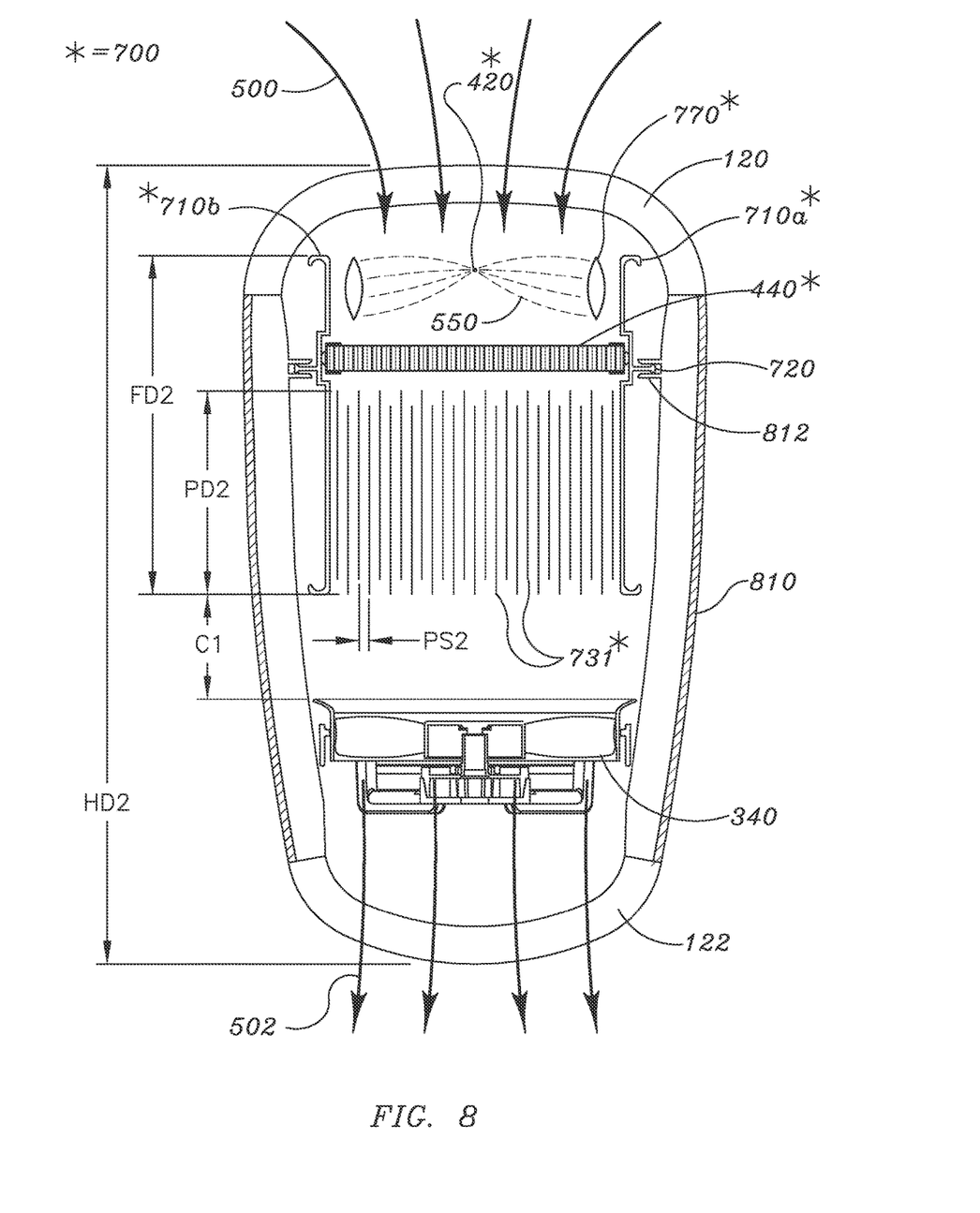
FIG. 8 is another alternate horizontal cross section view AA of FIG. 1.

FIG. 8 is an alternate horizontal cross section view AA of improved electrostatic precipitation air cleaner 100 shown in FIG. 1 including filter cell 700. As shown, intake air 500 is drawn into housing 810 through air intake 120 by air mover 340 and subsequently passes through ionization field 550, intermediate element 440, collector plates 731, air mover 340 and exits housing 810 through air exit 122 as clean air 502. As shown, collector plates 731 are uni-planar and do not include structural bends 435 as shown in FIGS. 4, 5 and 6. Also shown are projections 720 corresponding with right frame side 710a and left frame side 710b of filter cell 700. Projections 720 interface with corresponding walls 812 of housing 810 to assure that filter cell 700 is installed correctly in the device.

Ionization field 550 is generated between ion emitter electrode 420 and electrically biased strippers 770 located on either side of ion emitter electrode 420 by inducing a biased voltage potential between ion emitter electrode 420 and electrically biased strippers 770. In this embodiment, intermediate element 440 is not electrically biased relative to ion emitter electrode 420. In the preferred embodiment, ion emitter electrode 420 is charged with a positive voltage and electrically biased strippers 770 are negatively charged or connected to ground.

Also shown are dimensions C1, PD2, PS2, HD2, and FD2. C1 is the clearance distance as measured in the direction of an air flow through filter cell 700 which is desired for efficient air flow from filter cell 700 to air mover 340. PD2 is the depth as measured in the direction of an air flow through filter cell 700 of collector plates 731 to provide sufficient filtration of intake air 500. PS2 is the dimension of the space between each of collector plates 731. HD2 is the overall depth of housing 810 as measured in the direction of an air flow through filter cell 700.

Although FIGS. 5 and 8 are similar there are some distinctions that exist. A first distinction is that right frame side 410a and left frame side 410b of FIG. 5 are electrically conductive and/or are coated with an electrically conductive material while right frame side 710a and left frame side 710b of FIG. 8 are not electrically conductive. Right frame side 410a and left frame side 410b of FIG. 5 are electrically biased with reference to ion emitter electrode 420 and are utilized to produce ionization field 550. The embodiment of FIG. 8 requires the use of electrically biased strippers 770 to produce ionization field 550 associated with FIG. 8. The additional components shown in FIG. 8 may increase the cost and complication of the assembly.

Another distinction is intermediate element 440 of FIG. 5 is electrically biased with reference to ion emitter electrode 420 and is utilized to enhance the production of ionization field 550. As shown, the electrical biased characteristic of intermediate element 440 of FIG. 5 is achieved through contact with right frame side 410a and left frame side 410b. Intermediate element 440 of FIG. 8 is not electrically biased with reference to ion emitter electrode 420 and does not serve to enhance the production of ionization field 550. It should be noted, however, that intermediate element 440 in both the embodiment of FIG. 5 and the embodiment of FIG. 8 are used to mitigate the passage of large particles from entering collector plates 431 and 731 respectively.

Yet another distinction is collector plates 431 of FIG. 5 are not uni-planar having non parallel surfaces relative to each other, and include structural bends 435, whereas collector plates 731 of FIG. 8 are uni-planar and do not include structural bends. As mentioned, structural bends 435 facilitate the flatness and structural integrity of collector plates 431. The increased flatness and structural strength in turn allows the space between each of collector plates 431, shown as PS1, to be minimized when compared to the space between each of collector plates 731, shown as PS2. Minimization of PS1 can therefore be accomplished without increasing unwanted electrical arcing between collector plates 431 that may occur due to being bent or miss-shaped or damaged associated with collector plates 731, which are uni-planar. The minimized PS1 provides the ability to have more collector plates 431 between right frame side 410a and left frame side 410b as compared to the number of collector plates 731 between right frame side 710a and left frame side 710b and allows the embodiment of FIG. 5 to have the same amount of collector surface area with a minimized plate depth PD1 when compared to PD2 of FIG. 8. The minimization of PD1 contributes to the minimization of filter depth FD1 and housing depth HD1 of FIG. 5 when compared to filter depth FD2 and housing depth HD2 of FIG. 8. This overall minimization increases the space saving characteristics of the embodiment of FIG. 5 when compared to the embodiment of FIG. 8.

Figure 9:
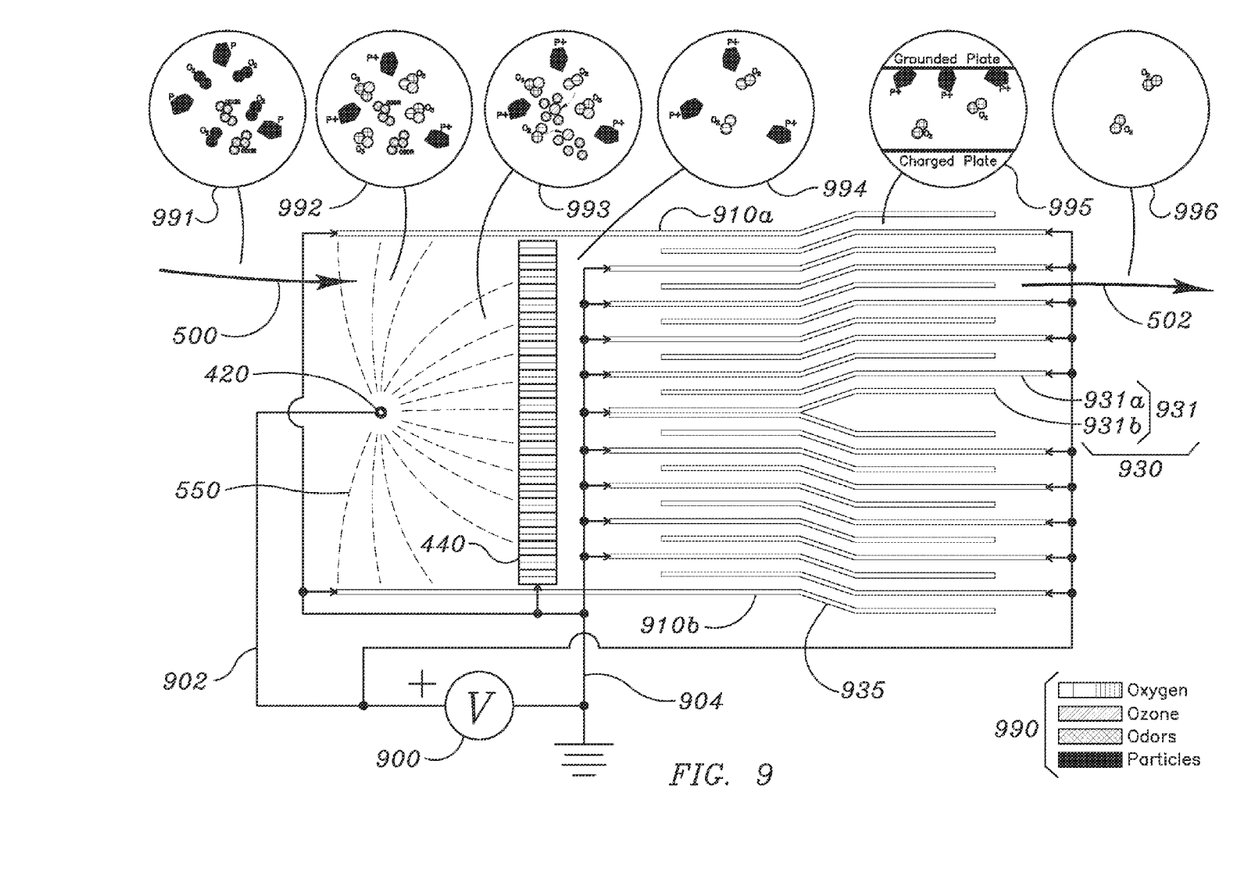
FIG. 9 is a schematic illustration of the electrical and performance characteristics of an embodiment of an improved electrostatic precipitation air cleaner.

FIG. 9 is a schematic illustration of electrical and performance characteristics of improved electrostatic precipitation air cleaner 100. As shown, voltage source 900 supplies a positive voltage to ion emitter electrode 420, and positive charged plates 931a. The negative or ground is connected to right frame side 910a, left frame side 910b, intermediate element 440 and grounded plates 931b. Positive circuit 902 and grounded circuit 904 may be comprised of wires, contact plates, contact springs, and the like without deviating from the spirit of the invention. As can be seen, collector electrode 930 is comprised of collector plates 931.

Also shown are six stages of the air purification process 991, 992, 993, 994, 995, and 996. Also shown is key 990 as an aid to distinguish the various elements found in the illustrated six stages. Intake air 500 enters the device in stage one 991 and contains oxygen molecules, odors molecules and other particles. Intake air passes through ionization field 550 in stage two 992, wherein some of the oxygen molecules are converted to ozone molecules ($O_3$) and the particles within the intake air 500 are charged with a positive charge. Stage three 993 occurs between ion emitter electrode 420 and intermediate element 440, wherein the unstable ozone molecules degrade and destroy the odor molecules. Intermediate element 440 in the present embodiment is constructed of and/or coated with a catalytic ozone conversion material or an ozone absorption material such as manganese oxide. Stage four 994 is subsequent intermediate element 440 wherein a substantial portion of the ozone molecules have been removed by the ozone absorption material of intermediate element 440. Stage five 995 is located between electrically biased collector plates 931 and electrically biased right frame side 910a, and left frame side 910b. The particles that were positively charged by ionization field 550 are repelled by positive charged plates 931a and electrostatically adhere to grounded plates 931b, right frame side 910a, and left frame side 910b. Stage six 996 illustrates clean air 502 exiting electrostatic precipitation air cleaner 100 wherein a substantial portion of the odor molecules, ozone and other particles have been removed.

As shown, collector plates 931 right frame side 910a and left frame side 910b include structural bends 935. In conjunction with added structural strength and flatness of collector plates 931, structural bends 935 also serve to re-direct a flow of air as it passes through stage five 995 of the air purification process. The re-direction of the air flow causes the air to impinge the surface of negative collector plates 931b and enhances the efficiency of the particle collection of stage five 995 when compared to the uni-planar collector plates 731 of FIG. 8.

It has been found that locating negative collector plates 931b ahead of positive charged plates 931a relative to the flow of air through collector electrode 930 serves to promote particle collection efficiency. The positively charged particles in the airflow are attracted to negative collector plates 931b as they enter collector electrode 930 which promotes the particle entry into the multiple spaces between negative collector plates 931b and positive charged plates 931a.

It has been found that the location of intermediate element 440 as described subsequent to ion emitter electrode 420 and prior to collector electrodes 430, 730 and 930, as shown, has several distinct advantages. The first advantage is the location of intermediate element 440 prior to collector electrodes 430, 730, and 930 acts as a particulate per-filter and prevents large debris from entering collector electrodes 430, 730, and 930, thereby mitigating possible electrical arcing and shorts between the biased collector plates 431, 731 and 931.

Another advantage of locating intermediate element 430 as described subsequent to ion emitter electrode 420 is the possibility of inducing the opposite electrical charge in intermediate element 430 relative to ion emitter electrode 420. The efficiency of ion production within ionization field 550 is enhanced and the voltage supplied to the ion emitter electrode 420 can be reduced. In one embodiment, the amount of ozone produced by improved electrostatic precipitation air cleaner 100 utilizing an opposite charge intermediate element 440 relative to ion emitter electrode 420 was sufficiently low to pass industrial and environmental regulations absent ozone absorption materials and coatings.

As can be seen, the improved electrostatic precipitation air cleaner shown and described in the present invention overcomes many deficiencies of conventional electrostatic precipitation air cleaners. The improved electrostatic precipitation air cleaners reduces and/or eliminate ozone which results from the electrostatic precipitation process and mitigates the arcing problem associated with the biased collector plates. The improved electrostatic precipitation air cleaners also reduces materials and manufacturing costs while providing a clean air delivery rate sufficient to clean an ordinary sized room.

Although the invention has been described with reference to exemplary embodiments, it is not limited thereto. Rather, the appended claims should be construed to include other variants and embodiments of the invention, which may be made by those skilled in the art without departing from the true spirit and scope of the present invention.

What is claimed:

1. A portable electrostatic precipitation room air cleaner comprising:
    a housing defining an interior space;
    an air mover located in said interior space, said air mover configured to generate a flow of air;
    a voltage generator configured to generate at least a positive voltage;
    an air filtration cell located in said housing comprising:
    at least one ion emitter electrode;
    a collector electrode comprising:
        a plurality of collector plates, each collector plate comprising:
            at least two non-parallel surfaces angled relative to each other;
            a thickness measured substantially perpendicular to a direction of movement of said flow of air;
            a width measured substantially parallel to said direction of movement of said flow of air;
            a length measured substantially perpendicular to both said thickness and said width of said collector plate;
        a location of said plurality of collector plates relative to each other defined by a distance between each of said plurality of collector plates measured substantially parallel to said thickness of each of said plurality of collector plates;
        a plurality of air flow passages between each of said plurality of collector plates defined by said width, said length and said distance between each of said plurality of collector plates;
    an electrical circuit comprising:
        a positively charged bank of collector plates comprising every other of said plurality of collector plates in said collector electrode connected to said positive voltage generated by said voltage generator;
        a grounded bank of collector plates comprising every other of said plurality of collector plates not connected to said positive voltage connected to at least one of an electrical ground and a negative voltage;
    wherein said at least one ion emitter electrode is located upstream of said collector electrode relative to said direction of movement of said flow of air;
    wherein substantially all of said flow of air passes through said collector electrode; and
    wherein said at least two non-parallel surfaces angled relative to each other of each of said collector plates redirects said direction of movement of said flow of air passing through said collector electrode.

2. The portable electrostatic precipitation room air cleaner of claim 1, wherein said electrical circuit further comprises said at least one ion emitter electrode connected to said positive voltage.

3. The portable electrostatic precipitation room air cleaner of claim 2, wherein said positive voltage connected to said positively charged bank of collector plates has a different potential relative to said positive voltage connected to said at least one ion emitter electrode.

4. The portable electrostatic precipitation room air cleaner of claim 2, wherein said grounded bank of collector plates is located closer to said at least one ion emitter electrode in a direction parallel to said direction of movement of said flow of air when compared to a location of said positively charged bank of collector plates.

5. The portable electrostatic precipitation room air cleaner of claim 2, further comprising at least one ion stripper located proximate said at least one ion emitter electrode, wherein said at least one ion stripper is connected to at least one of said electrical ground and said negative voltage.

6. The portable electrostatic precipitation room air cleaner of claim 1, wherein said electrical circuit further comprises said at least one ion emitter electrode connected to at least one of said electrical ground and said negative voltage, and wherein said positively charged bank of collector plates is located closer to said at least one ion emitter electrode in a direction parallel to said direction of movement of said flow of air when compared to a location of said grounded bank of collector plates.

7. The portable electrostatic precipitation room air cleaner of claim 1, further comprising at least one ion stripper located proximate said at least one ion emitter electrode, wherein said at least one ion emitter electrode is connected to at least one of said electrical ground and said negative voltage, and wherein said at least one ion stripper is connected to said positive voltage.

8. The portable electrostatic precipitation room air cleaner of claim 1, wherein said air mover is located up steam of said at least one ion emitter electrode relative to said direction of movement of said flow of air.

9. The portable electrostatic precipitation room air cleaner of claim 1, wherein said air mover is located down steam of said collector electrode relative to said direction of movement of said flow of air.

10. The portable electrostatic precipitation room air cleaner of claim 1, wherein said thickness is less than 0.015 inches [0.38 mm] and said distance between each of said plurality of collector plates is less than 15 times said thickness of each of said plurality of collector plates.

11. The portable electrostatic precipitation room air cleaner of claim 1, wherein said length of each of said plurality of collector plates is greater than at least 4.5 times said width of each of said plurality of collector plates.

12. The portable electrostatic precipitation room air cleaner of claim 1, further comprising:
at least one spacer hole through each of said plurality of collector plates; and
at least one spacer comb;
wherein said location of said plurality of collector plates in said collector electrode aligns said at least one spacer hole in each of said plurality of collector plates, wherein said at least one spacer comb is inserted through said aligned spacer holes and said at least one spacer comb serves to maintain said distance between each of said plurality of collector plates.

13. The portable electrostatic precipitation room air cleaner of claim 1, further comprising:
an upper frame; and
a lower frame;
wherein said upper and lower frames are connected to said plurality of collector plates and maintain said location of said plurality of collector plates of said collector electrode;
wherein said upper and lower frames maintain a location of said at least one ion emitter electrode relative to said collector electrode.

14. The portable electrostatic precipitation room air cleaner of claim 13, wherein said upper and lower frames, said collector electrode, and said at least one ion emitter electrode comprise a unitary assembly.

15. The portable electrostatic precipitation room air cleaner of claim 14, wherein said unitary assembly can be cleaned absent the need of disassembling said unitary assembly.

16. An air filtration cell for use in a portable electrostatic precipitation room air cleaner, comprising:
a cell frame comprising;
an upper frame;
a lower frame;
a left side frame extending between said upper frame and said lower frame;
a right side frame extending between said upper frame and said lower frame;
at least one ion emitter electrode extending between said upper frame and said lower frame;
at least one ion stripper located proximate said at least one ion emitter electrode;
a collector electrode comprising:
a plurality of collector plates extending between said upper frame and said lower frame, each of said plurality of collector plates comprising:
at least two non-parallel surfaces angled relative to each other;
a thickness measured substantially perpendicular to said left frame and said right frame;
a length measured substantially perpendicular to said upper frame and said lower frame;
a width measured substantially perpendicular to both said thickness and said length of said collector plate;
a location of said plurality of collector plates relative to each other defined by a distance between each of said plurality of collector plates measured substantially parallel to said thickness of each of said plurality of collector plates;
a plurality of air flow passages between each of said plurality of collector plates defined by said width, said length and said distance between each of said plurality of collector plates; and
wherein said cell frame, said at least one ion emitter electrode, said at least one ion stripper, and said collector electrode comprise a unitary assembly.

17. The air filtration cell of claim 16, wherein said unitary assembly can be removed from said portable electrostatic precipitation room air cleaner and cleaned absent the disassembling of said unitary assembly.

18. The air filtration cell of claim 16, wherein said portable air cleaner produces a flow of air passing through said collector electrode, and wherein said at least two non-parallel surfaces angled relative to each other of each of said plurality of collector plates redirect a direction of movement of said flow of air passing through said collector electrode.

19. The air filtration cell of claim 16, further comprising an electrical circuit comprising:
a voltage generator configured to generate a positive voltage;
a positively charged bank of collector plates comprising every other of said plurality of collector plates in said collector electrode connected to said positive voltage; and
a grounded bank of collector plates comprising every other of said plurality of multiple collector plates not connected to said positive voltage connected to at least one of an electrical ground and a negative voltage.

20. The air filtration cell of claim 19, wherein said at least one ion emitter electrode is connected to said positive voltage, and wherein said at least one ion stripper is connected to at least one of said electrical ground and said negative voltage.

21. The air filtration cell of claim 20, wherein said positive voltage connected to said positively charged bank of collector plates has a different potential relative to said positive voltage connected to said at least one ion emitter electrode.

22. The air filtration cell of claim 16, wherein one of said right side frame or said left side frame is made of an electrically conductive material and is unitary with said at least one ion stripper.

23. The air filtration cell of claim 16, wherein said cell frame defines an air passageway, wherein said plurality of collector plates are located within said air passageway.

24. The air filtration cell of claim 16, further comprising;
at least one spacer hole through each of said plurality of collector plates;
at least one spacer comb; and
wherein said location of said plurality of collector plates in said collector electrode align said at least one spacer hole in each of said plurality of collector plates, and wherein said at least one spacer comb is inserted through said aligned spacer holes and said at least one spacer comb serves to maintain said distance between each of said plurality of collector plates.

25. The air filtration cell of claim 16, wherein said thickness is less than 0.015 inches [0.38 mm] and said distance between each of said plurality of collector plates is less than 15 times said thickness of each of said plurality of collector plates.

\* \* \* \* \*